US005699486A

United States Patent [19]
Tullis et al.

[11] Patent Number: 5,699,486
[45] Date of Patent: Dec. 16, 1997

[54] SYSTEM FOR SPEAKING HYPERTEXT DOCUMENTS SUCH AS COMPUTERIZED HELP FILES

[75] Inventors: Thomas S. Tullis, Laguna Niguel; Marianne L. Kodimer, Anaheim, both of Calif.

[73] Assignee: Canon Information Systems, Inc., Costa Mesa, Calif.

[21] Appl. No.: 807,033

[22] Filed: Feb. 28, 1997

Related U.S. Application Data

[63] Continuation of Ser. No. 156,690, Nov. 24, 1993, abandoned.

[51] Int. Cl.$^6$ ........................................ G01L 3/00
[52] U.S. Cl. ............................. 395/2.79; 395/2.84
[58] Field of Search ...................... 395/2.09, 2.67, 395/2.69, 2.79, 2.8, 2.82, 2.83, 2.84

[56] References Cited

U.S. PATENT DOCUMENTS

| | | | |
|---|---|---|---|
| 4,397,635 | 8/1983 | Samuels | 434/178 |
| 5,204,947 | 4/1993 | Bernstein et al. | 395/157 |
| 5,297,249 | 3/1994 | Bernstein et al. | 395/156 |
| 5,408,659 | 4/1995 | Cavendish et al. | 395/650 |

FOREIGN PATENT DOCUMENTS 509947  10/1992  European Pat. Off. .

OTHER PUBLICATIONS

Microsoft Professional Toolkit for Visual Basic–Help Compiler Guide ©1992, pp. 1–71.
P. Bonner, "Windows Help Becomes Development Tool", PC Week, vol. 10, No. 6, Feb. 15, 1993, pp. S28.
R. Burk, "Automatic Help Topic Printing", Windows–DOS Developer's Journal, vol. 4, No. 3, Mar. 1993, pp. 73–79.
E.M.–Y. Wang, et al., "A Usability Evaluation Of Text And Speech Redundant Help Messages On A Reader Interface", Human–Computer Interaction: software & Hardware Interfaces (HIC International '93) vol. 2, Aug. 8–13, 1993, pp. 724–729.
"Help System For Computer Users–Presents Message Explaining Function Of Key In Response To Pressing That Key When In Help Mode", Anonymous, Research Disclosure, RD263002, Mar. 10, 1986.
"Method For Associating Help With Host Application Functions", IBM Technical Disclosure Bulletin, vol. 37, No. 4A, pp. 669–670, Apr. 1994.
"'?': A Context–Sensitive Help System Based On Hypertext", W. Lee, 24th ACM/IEEE Design Automation Conference, 1987, pp. 429–435.
"Auditory Versus Visual Presentation Of Help Messages", P.A. Savage, et al., Proceedings of the Human Factors Society 35th Annual Meeting, vol. 1, pp. 244–248, Sep. 6, 1991.

*Primary Examiner*—Allen R. MacDonald
*Assistant Examiner*—Patrick N. Edouard
*Attorney, Agent, or Firm*—Fitzpatrick, Cella, Harper & Scinto

[57] ABSTRACT

A system for speaking structured files such as computerized help files thereby reducing the amount of on-screen clutter and allowing an operator to receive help while simultaneously viewing the screen generated by a computer application program. In response to commands to process such files, a help engine is instantiated and, in accordance with parameters set by the operator, is set to give spoken help and/or visual help. When giving spoken help, hypertext links to other topics in the structured file are detected and stored, and in response to operator commands, the help engine jumps to those other topics and begins speaking the jumped-to topic. Likewise, as the help file is spoken, the hierarchical structure, if any, of topics in the file is detected and stored and in response to operator commands the help engine jumps to specified topics. Preferably, as the hypertext links and the hierarchical structure are spoken, they are spoken with aural cues such as a voice that is different from the voice used for the remainder of the topic. When other topics are jumped to, those other topics may be spoken in the same voice or in the different voice so as to assist the operator in navigation through the file.

34 Claims, 7 Drawing Sheets

SYSTEM FOR SPEAKING HYPERTEXT DOCUMENTS SUCH AS COMPUTERIZED HELP FILES

This application is a continuation of application Ser. No. 08/156,690, filed Nov. 24, 1993, now abandoned.

BACKGROUND OF THE INVENTION

1. Field of the Invention

The present invention concerns a computerized system for speaking hypertext documents, i.e. a document containing embedded links to other locations in the document, such as a computerized help file which contains embedded links to multiple help topics. More particularly, the system concerns a system for providing spoken help information in response to a computer operator's request for help with an application program such as a word processing program or other information processing program.

2. Description of the Related Art

With increasing sophistication, complexity and capabilities of computer application programs such as word processing programs and other information processing programs, more and more attention has been focused on providing users of those application programs with on-demand (or on-line) help. It is now common, for example, for computer application programs to designate a special key such as a "F1" key which, when depressed during execution of the application program, will provide the operator with help concerning the application program. Help ordinarily consists of textual information which is stored in a hypertext file of help topics and which is retrieved from that file by a separate computer program, normally called a "help engine", and displayed in text form on the computer screen.

A disadvantage of displaying help information on the computer screen is that the help information obstructs the operator's view of the application program. More particularly, an operator ordinarily requires help while in the middle of executing a software task in conjunction with the application program. Help therefore is requested when the computer's screen is displaying information with which the operator needs help. But when the help information is displayed on the screen, it obstructs the operator's view of the application program with which he needs help, making it difficult to implement the information provided by help. Commonly the operator must read the help text, clear the screen of that text, and then try to remember what it said.

SUMMARY OF THE INVENTION

It is an object of the invention to address the foregoing difficulties by providing a system which speaks hypertext files such as computerized help files thereby reducing the amount of on-screen clutter and allowing an operator to view the computer application program while attending to help.

In one aspect, the invention is a computerized method for processing a hypertext file of help topics, which may be arranged hierarchically, in conjunction with execution of a computer application program which includes operator-invocable commands to execute a help engine. In response to such commands, the help engine is instantiated and, in accordance with parameters set by the operator, it is set to give spoken help and/or visual help. In the case where visual help is set, the help engine displays topics from the file of topics on a computer screen; correspondingly, when set to give spoken help, the help engine speaks topics from the file of topics. Specific topics that are spoken and/or displayed may be selected by the help engine in accordance with the current context of the application program in which case the current context is passed to the help engine when the help engine is instantiated.

In accordance with further aspects of the invention, as topics are spoken from the hypertext file, hypertext links to other topics in the file are detected and stored. In response to operator commands, the help engine jumps to those other topics and begins speaking the jumped-to topic. Most preferably, as the hypertext links are detected, an aural cue is given to the operator, such as by speaking the links to the operator in a voice distinguishable from the remainder of the help topic. In that case, it is also possible to speak the jumped-to topic in the same distinguishable voice as the voice for the link.

In accordance with further aspects of the invention, as topics are spoken from the hypertext file of topics, any hierarchical structure of topics, if there is one, is stored. In response to operator commands, it is possible to jump to and speak next or previous topics in the hierarchy, and to jump to and speak topics in other hierarchical levels. If desired, a spoken menu of hierarchical topics may be provided to the operator and the operator may select any one of those topics whereafter the selected topic is spoken.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENT

Figure 1:
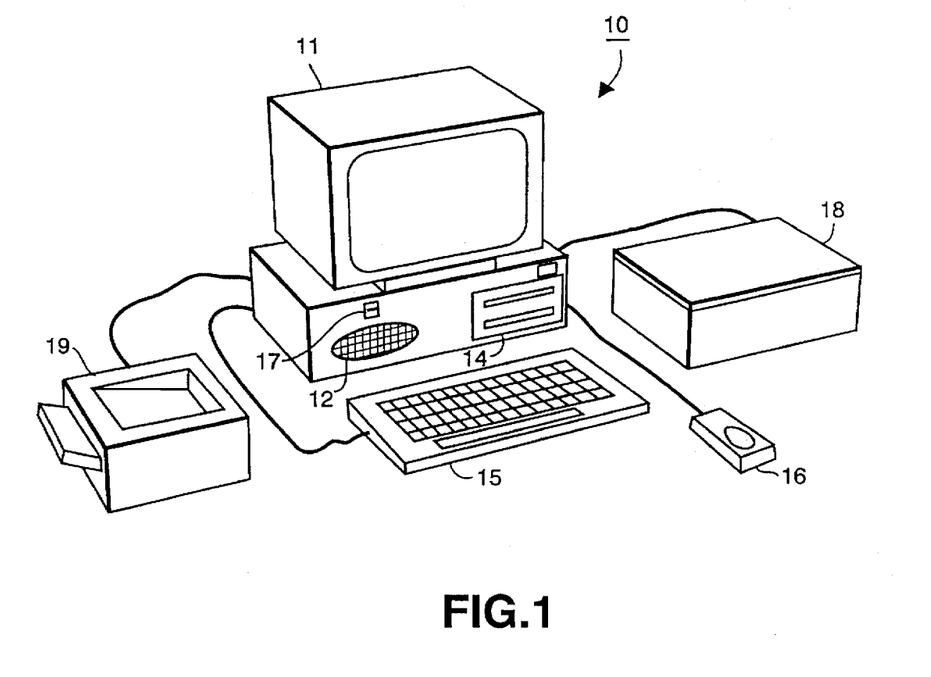
FIG. 1 is a perspective view showing the outward appearance of an apparatus according to the invention.

FIG. 1 is a view showing the outward appearance of a representative embodiment of the invention. Shown in FIG. 1 is computing equipment 10 such as an IBM PC or PC-compatible computer having a Microsoft® Windows windowing system and provided with a display screen 11 such as a color monitor and an internal speaker 12. Computing equipment 10 includes a mass storage device such as computer disk drive 14 for storing data files for application programs, such as bit map image files, text files, sound files, animation files and digital motion video files, in compressed or uncompressed format, as well as for storing the application programs themselves such as a word processing application program or other information processing programs which contain stored program instruction steps by which computing equipment 10 manipulates the data files and presents data in those files to an operator via display screen 11 or speaker 12.

Although an IBM PC or PC-compatible computer with Windows windowing system is shown, any suitable general or special purpose computer with any appropriate operating system may be used instead.

Keyboard 15 is connected to computing equipment 10 to permit input of text data and to permit operator selection and manipulation of objects displayed on display screen 11. Likewise, pointing device 16 such as a mouse or the like is connected to permit selection and manipulation of objects on the display screen. Microphone 17 permits inputting audio information.

Computing equipment 10 is also generally provided with various input and output peripherals. Shown here are digital scanner 18 and printer 19, although other devices may also be used such as CDROMs, an interface to a network or other external source of data such as a modem or facsimile, a removable floppy disk drive, or a motion video or interface for inputting frames of analog video information.

In accordance with operator instructions, stored application programs are activated and permit processing and manipulation of data. For example, a word processing program may be activated to permit an operator to create, view, manipulate and print documents which may contain objects such as text objects, bit map objects, computer graphic objects, motion video objects and the like. Other application programs such as spreadsheet programs and similar information processing programs may further be provided on disk 14 for operator selection and use.

Also stored on disk 14 is a help engine which is an application program used in conjunction with other application programs. More specifically, when help is requested by an operator, the computing equipment instantiates the help engine which provides the operator with on-demand help information. The help engine provides help to the operator in accordance with a hypertext file of help topics which is also stored on disk 14, generally, one hypertext help file for each application program. The help engine is arranged so that it may be set by the operator into different modes to provide visual help and/or spoken help. When providing visual help, the help engine displays text from the hypertext files on display screen 11; likewise, when providing spoken help the help engine speaks the hypertext files over speaker 12.

Figure 2:
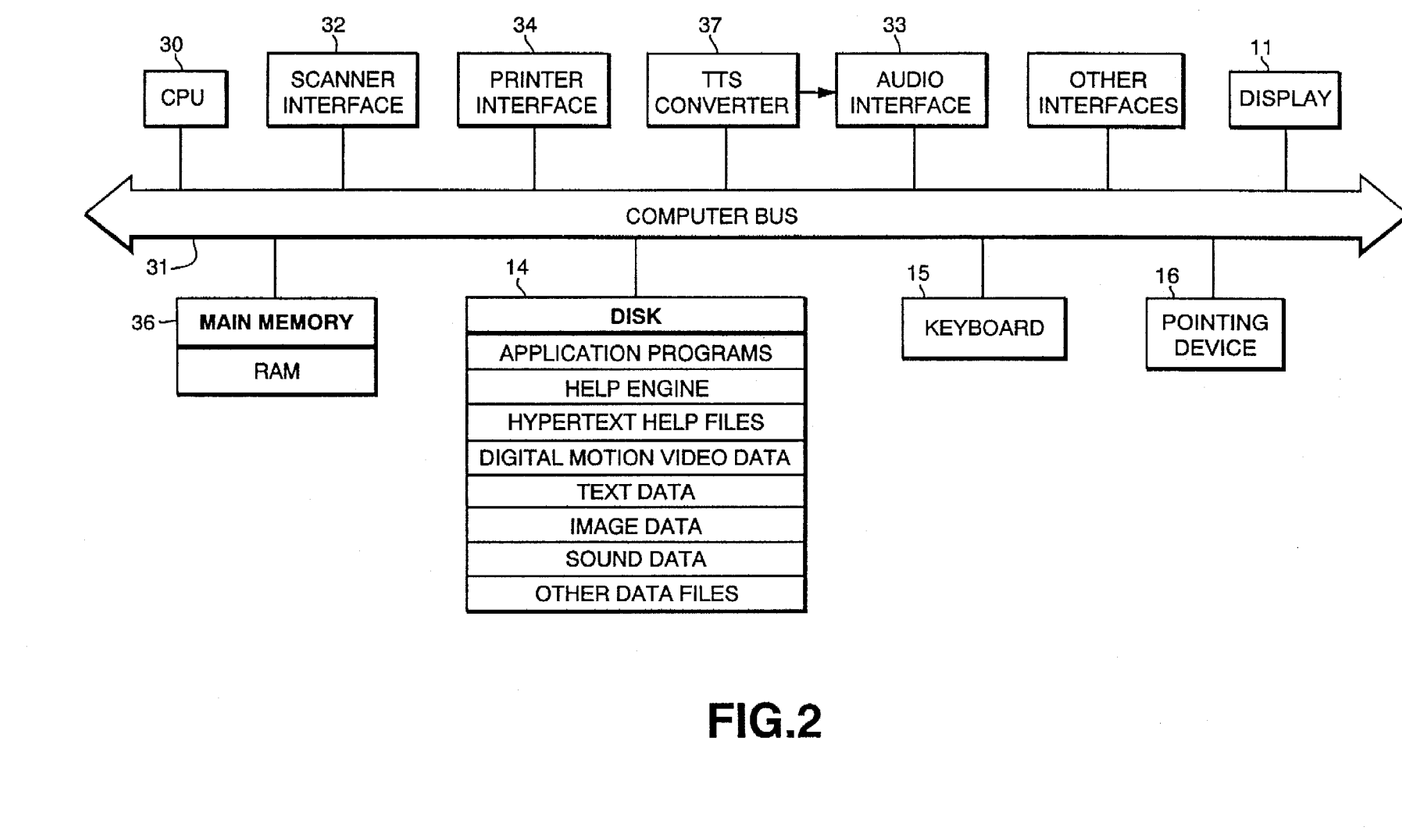
FIG. 2 is a block diagram of the FIG. 1 apparatus.

FIG. 2 is a detailed block diagram showing the internal construction of computing equipment 10. As shown in FIG. 2, computing equipment 10 includes a central processing unit (CPU) 30 such as an 80386 or a reduced instruction set computer (RISC) interfaced to computer bus 31. Also interfaced to computer bus 31 is display 11, disk 14, keyboard 15 and mouse 16. Scanner and printer interfaces 32 and 34 are provided for interface to scanner 18 and printer 19, respectively, and other interfaces 35 are provided for interface to modems, networks and the like. Audio interface 33 is provided for interfacing with microphone 17 and speaker 12.

A conventional text-to-speech converter is provided at 37. The text-to-speech converter 37, which may also be implemented in software, interprets text strings sent to it and converts those text strings to audio speech information. The text-to-speech converter 37 provides the audio speech information to speaker 12 for enunciation to the computer operator.

Main memory 36 interfaces to computer bus 31 so as to provide random access memory storage for use by CPU 30. In particular, when executing stored program instruction sequences such as application programs or the help engine, CPU 30 loads those instruction sequences from disk 14 (or other memory storage medium where they are stored) into main memory 36 and executes those stored program instruction sequences out of main memory 36.

Figure 3:
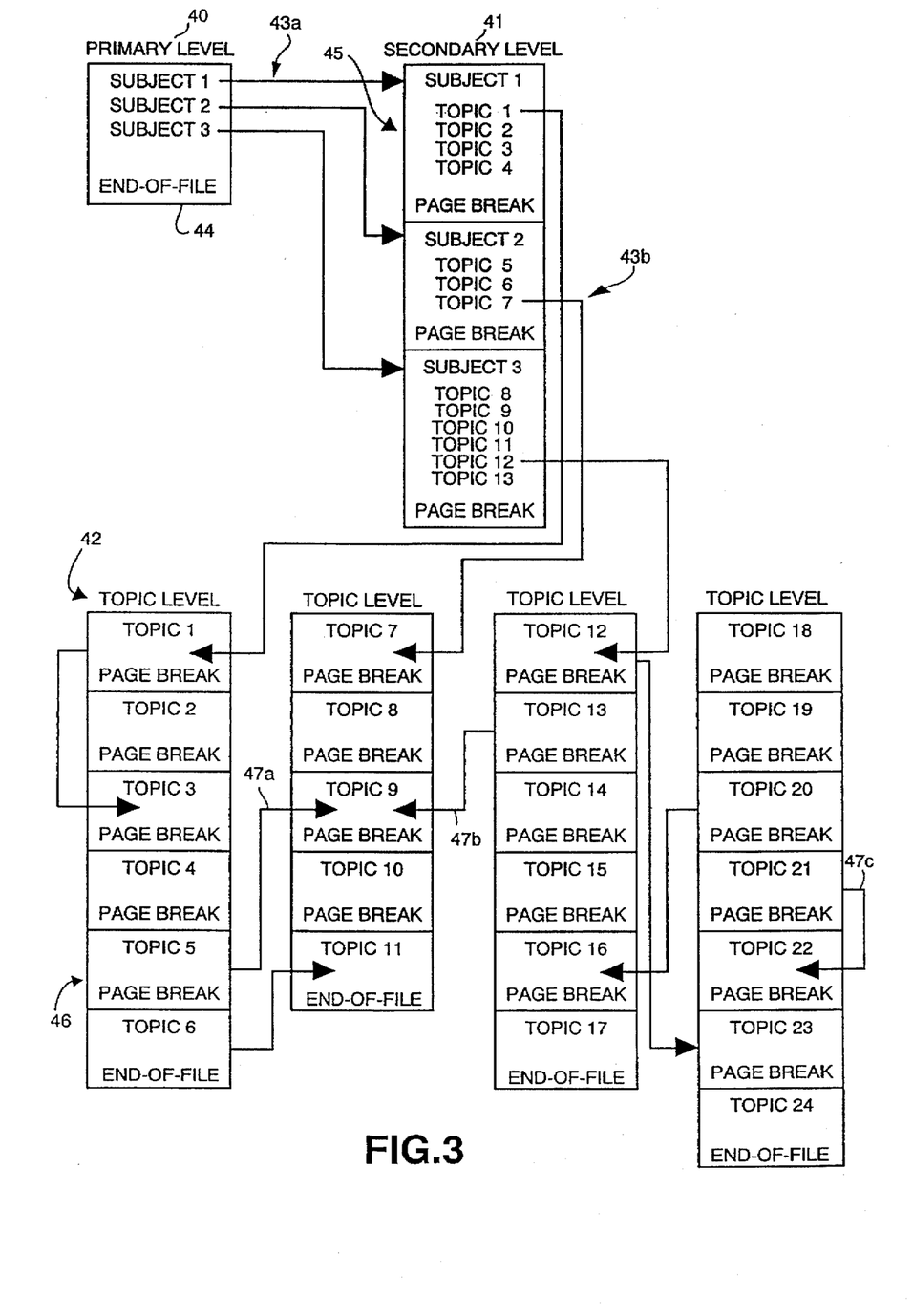
FIG. 3 is a view for explaining a hierarchically-ordered hypertext file of topics.

FIG. 3 is a view for explaining one possible organization of a hypertext file of help topics, and Appendix A is an exemplar of such a file. In this example, the hypertext file is ordered hierarchically with three different hierarchical levels, but it is to be understood that a flat (or single level) hypertext file is also usable. As shown in FIG. 3, the hierarchy contains three different levels, namely primary level 40, secondary level 41, and topic level 42. These levels are for illustrative purposes only and different numbers of levels (including just one) and a different hierarchical structure may be implemented.

For the three-level strucrue of FIG. 3, plural subjects 44 are indicated at the primary level. Each of those subjects, in turn, has a number of topics 45 included therein as listed at the secondary level 41. Each of those topics, in turn, has text information as indicated at 46.

Information at topic level 42 is primarily text information designed to give the operator assistance during execution of the application program. Other information may also be included at the topic level and, customarily, information such as bit map images may also be included as desired.

Information at the primary and secondary levels is primarily designed to define the hierarchical structure of the help file, but it may also include some textual information. Thus, as shown in Appendix A, subject level information which corresponds to secondary level 41, includes text information such as "The following topics are covered in this section" which provides an indication of the hierarchically ordered topics which are to follow.

Hierarchical links 43a connect primary level 40 to secondary level 41, and hierarchical links 43b connect secondary level 41 to topic level 42. Only some of links 43b have been depicted, but it is understood that a hierarchical link connects each topic heading in secondary level 41 to its associated topic listing in topic level 42.

Whatever number of hierarchical levels are included, the help file includes imbedded hypertext links which link one area of the file to another. Hypertext links may include links to the beginning of other topics, or they may include links to any location in the file. The hypertext links ordinarily originate from the body of the topics and key into another topic called the "jump" topic. Some hypertext links are depicted at 47a, b and c, but it is to be understood that these depicted links are illustrative only and more or fewer links may be provided as needed.

Two types of jumps using the links are provided: a return-type jump and a transfer-type jump. A return-type jump allows an operator to use the help engine to temporarily jump to another topic and then return to the jump-off point when the other topic is finished. Typically, a return-type jump is used to obtain a definition of terms, and after the definition is provided the help engine returns to the topic from which the definition was requested. A transfer-type jump, on the other hand, does not return to the topic from which the jump originated, but rather remains in the jumped-to topic. Thus, referring for example to Appendix A, topic number 12 ("Stack") is a return-type jump topic and after processing of that topic is complete, processing reverts to the topic from which the "Stack" topic was jumped from. On the other hand, topic number 4 ("Preventing Stack Overflow") is a transfer-type jump topic and processing does not revert to another topic unless operator intervention is encountered.

While as described above return-type jumps are used for short, footnote-like explanations, and transfer-type jumps are used for longer, more involved topics, size alone is not determinative, and it is possible to use transfer-type jumps for short topics and return-type jumps for extensive explanations.

Figure 4:
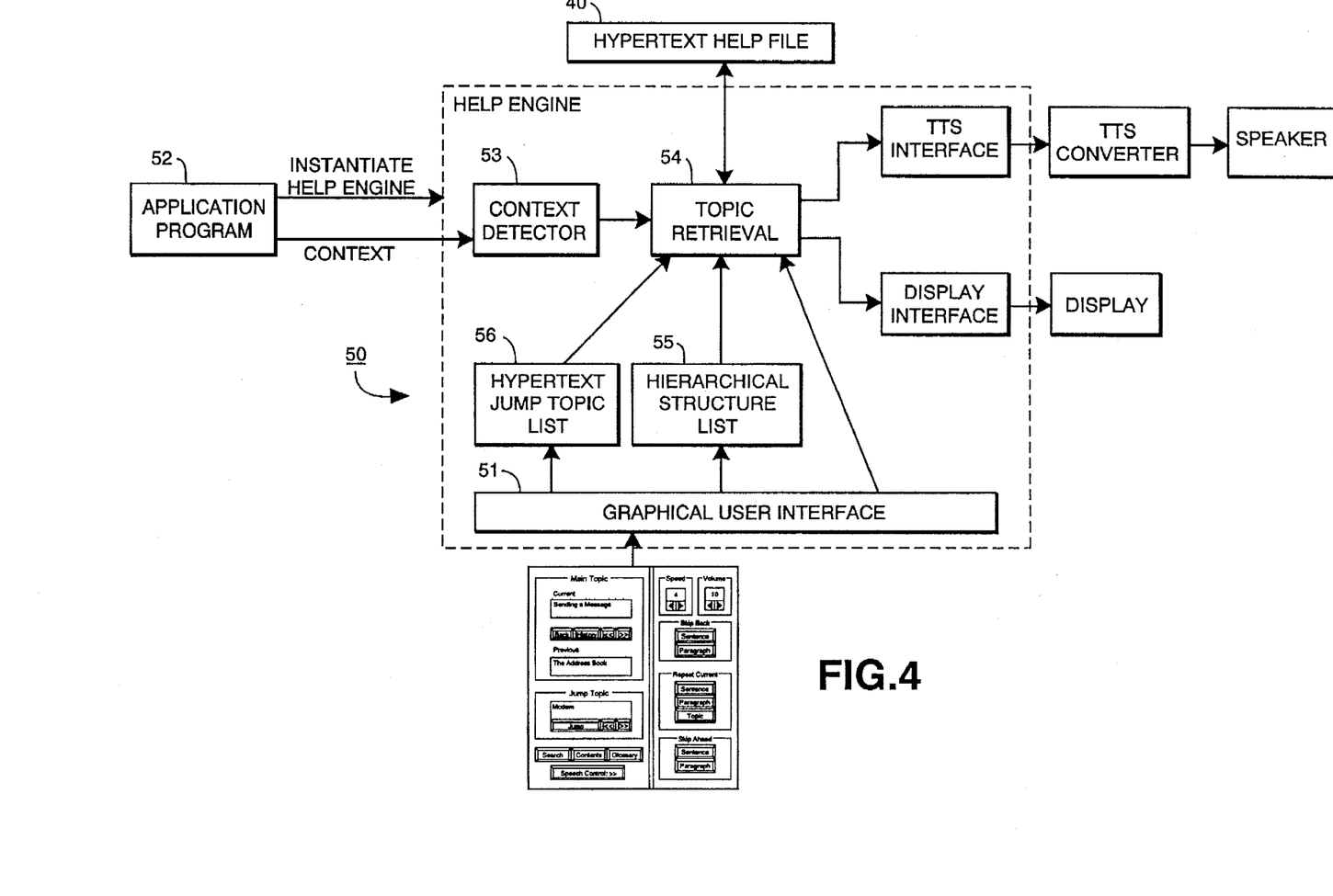
FIG. 4 is a functional block diagram for explaining operation of the visual and spoken help engine according to the invention.

FIG. 4 is a functional block diagram of a help engine in accordance with the present invention. As shown in FIG. 4, help engine 50 operates generally to retrieve help topics from hypertext help file 40 and, when in the spoken help mode, to speak them via text-to-speech interface 37 and, when in a visual mode, to display them via display 11. When in both a spoken and visual mode, both of these actions occur. The topics that are retrieved from the hypertext file are selected by the operator in accordance with manipulation of keyboard 15 or graphic user interface 51. The initial topic, however, may be set by the application program which instantiates the help engine. In more detail, when help is requested from within the application program 52, the application program instantiates help engine 50 and at the same time designates the current context of the application. The context, which may simply be a context number, is related to the current focus of the application, for example, a particular task that the operator is executing. The context is passed to context detector 53 within the help engine which retrieves the appropriate topic via topic retriever 54. The retrieved topic is spoken and/or displayed in accordance with the current mode of the help engine.

As topics are retrieved by topic retriever 54 and spoken and/or displayed, both hierarchical and hypertext jump topics are detected and stored in lists 55 and 56, respectively. In the spoken help mode, the hierarchical and hypertext jump topics are spoken with an aural cue to the operator such as by speaking with a voice that differs from the remainder of the topic; in the visual mode the hypertext and hierarchical jump topics are displayed with visual cues, for example, by single or double underlining or with different colors or fonts.

Figure 5:
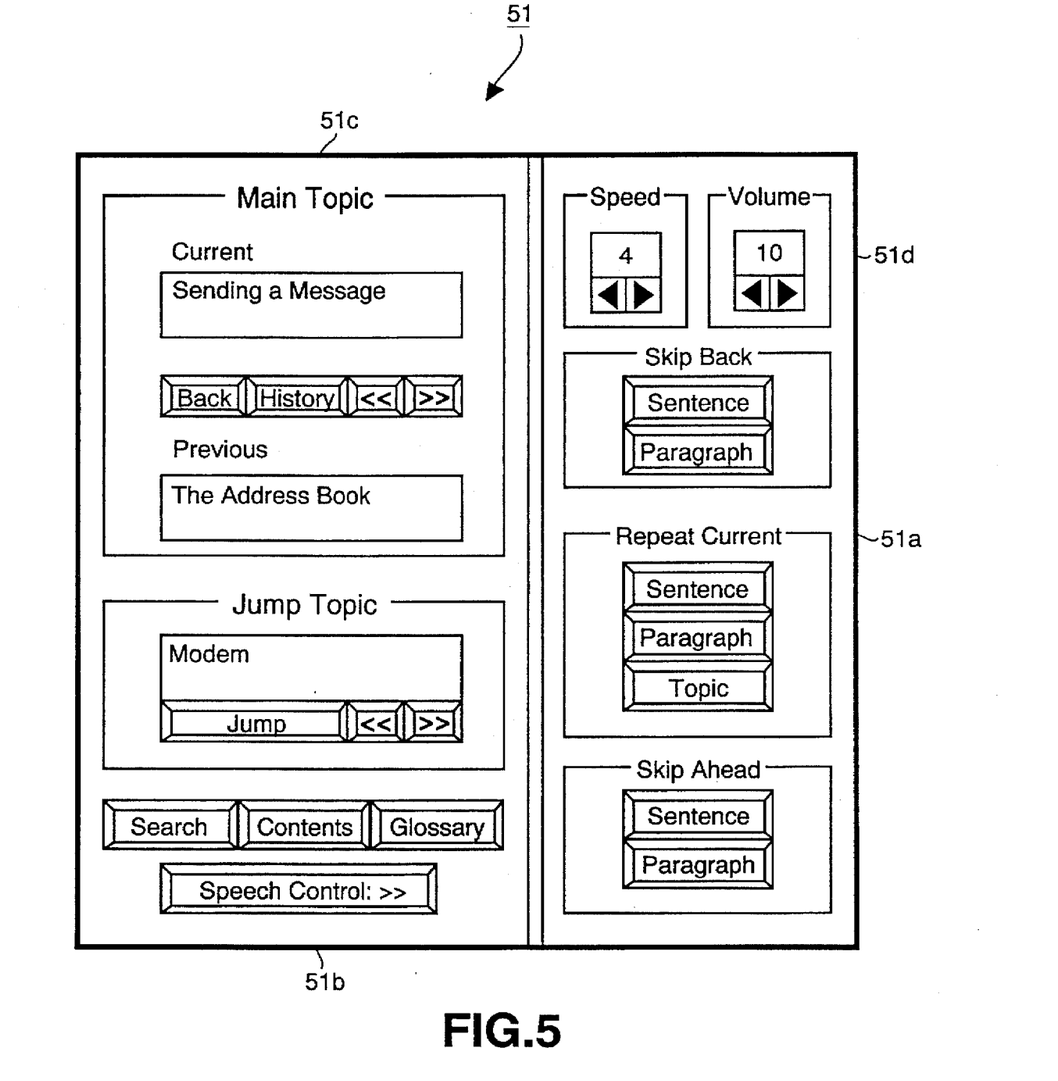
FIG. 5 is a representative screen display showing a user interface with the help engine.

FIG. 5 is a view of a computer-generated control panel displayable in a graphical user interface in connection with the help engine. Using controls indicated at 51a, it is possible to jump to one of the hypertext or hierarchical jump topics in lists 55 and 56, as described in more detail below. Using controls indicated at 51b, the operator may control the processing of text within a topic, for example, by skipping backward or forward through sentences or paragraphs. Using controls indicated at 51c, it is possible to change to different hierarchical levels in response to which the help engine speaks and/or displays the index at the new level. Finally, using controls at 51d, it is possible to change the text-to-speech parameters such as the speed or volume of the text-to-speech conversion.

In some applications, the control panel of FIG. 5 need not be displayed, and it is possible to provide user control over the help engine via other means such as keyboard control or speech recognition of spoken commands.

Figure 6A:
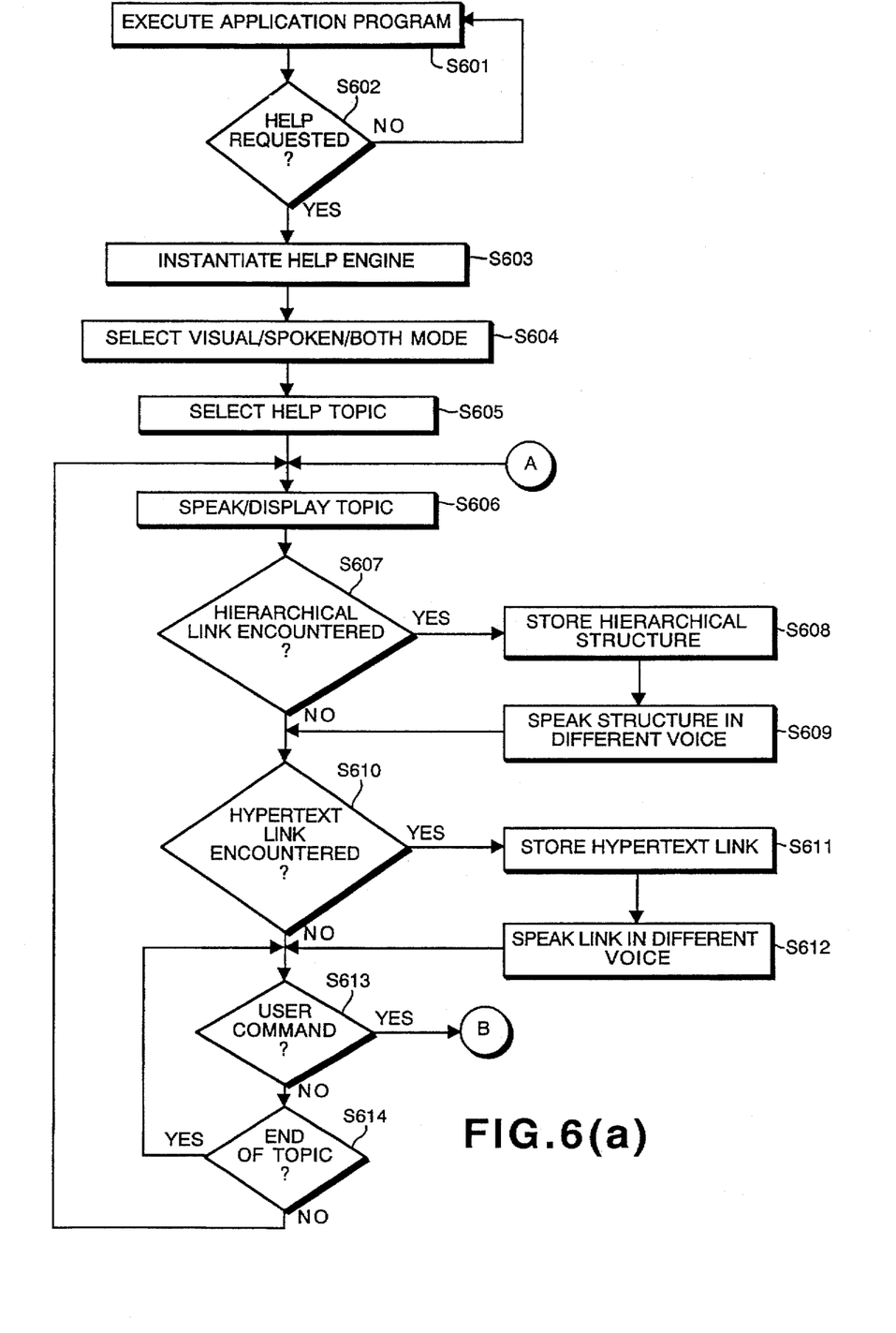
FIGS. 6(a) and 6(b) are flow diagram for explaining operation of the invention.
Figure 6B:
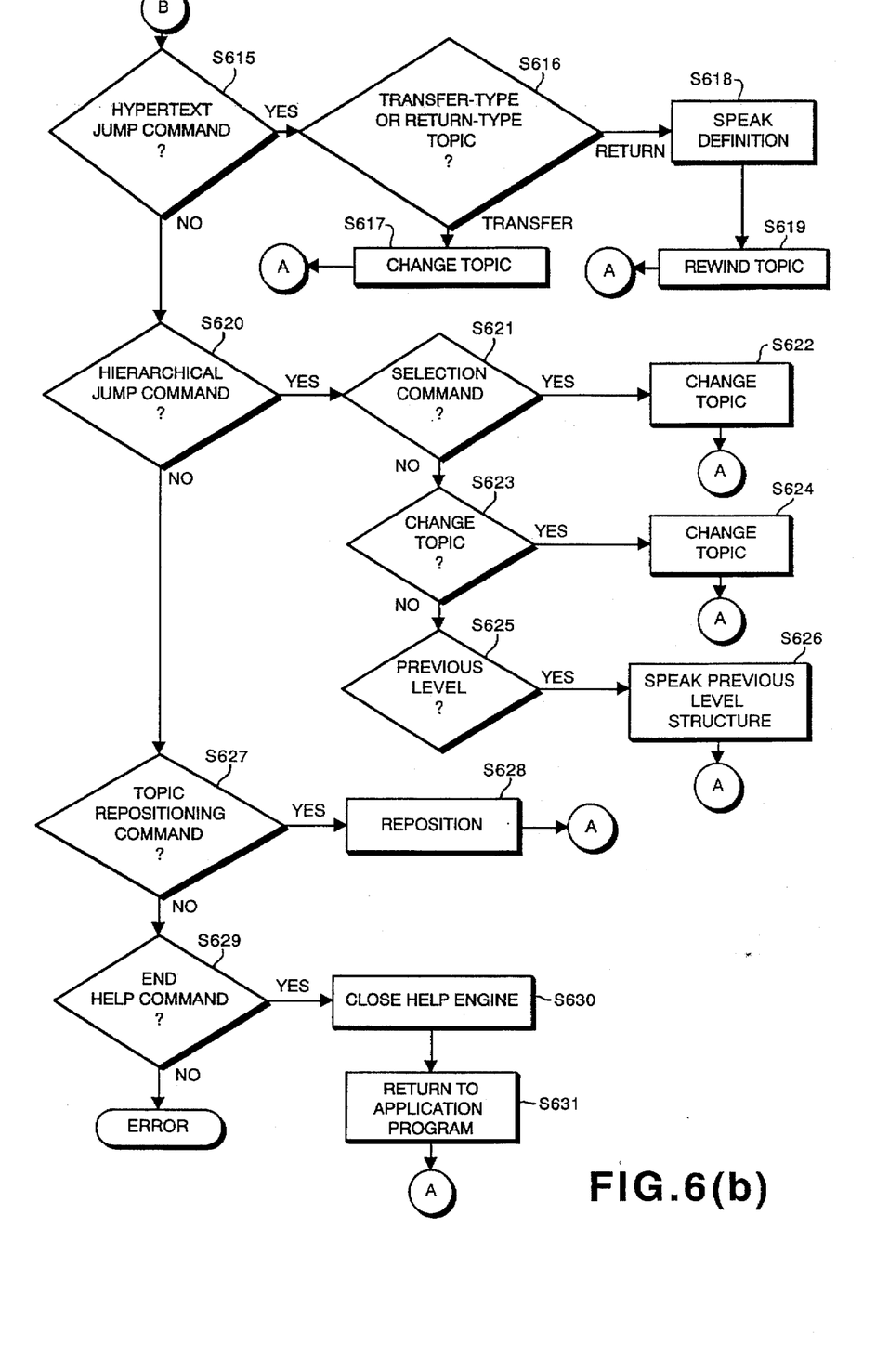

FIGS. 6(a) and 6(b) are flow diagram illustrating operation of the help engine according to the invention.

In step S601, an application program such as an information processing program is executed, and execution of that program continues until step S602 in which a request for help is issued by the operator. In step S603, the help engine is instantiated. The help engine may be instantiated in either visual or spoken mode, or both modes, as set by the operator in step S604. In step S605, the help engine selects the initial help topic. The initial selection may be made in accordance with context passed to the help engine by the application program, or it may be selected by other means, for example, by operator selection or by a default setting such as the primary level 40 in the hierarchical help file.

In step S606, in accordance with the selected spoken/ visual mode, the help engine begins speaking and/or displaying the selected help topic. If a hierarchical link is encountered while speaking the help topic (step S607), then in step S608 the hierarchical link is stored in list 55 and in step S609 an aural cue is given to the operator by changing the voice parameters for the text-to-speech converter so as to speak the hierarchical link in a voice (pitch, intonation, etc.) distinguishable from the remainder of the topic. Likewise, if a hypertext link is encountered (step S610), then in step S611 the hypertext link is stored in list 56 and in step S612 an aural cue is given to the operator by changing voice parameters of the text-to-speech converter so as to speak the hypertext link in a voice that is different than the remainder of the topic.

In step S613, the help engine determines whether a user command has been entered via keyboard 15 or graphical user interface 51. If no user commands have been entered, then flow advances to step S614 where the help engine determines if an end of topic has been encountered. If the end of topic has not been encountered then flow returns to step S606 where the help engine continues to speak and/or display the topic. On the other hand, if end of topic has been reached, then flow returns to step S613 where the help engine waits for operator input. Alternatively, though not shown, if end of topic has been reached, the help engine may begin to process the next sequential topic and continue on through to the end of all the topics in the current hierarchical level, whereafter flow returns to step S613.

When an operator command is detected in step S613 then flow advances to steps S615 through S631 where the help engine analyzes the operator command and takes the appropriate action. More specifically, if in step S615 the help engine detects a command to jump to a hypertext topic then flow advances to step S616 in which the help engine jumps to the last hypertext topic stored in list 56. If the hypertext jump is a transfer-type jump, then in step S617 the help engine changes the current topic and flow returns to step S606 to speak the topic. On the other hand, if the jump is a return-type jump, then in step S618 the help engine speaks the selected topic and then reverts back to the jumped-from topic to complete speaking that topic. Preferably, for a return-type jump, the voice in which the topic is spoken is the same as the voice in which the topic name was enunciated to the operator. It is also preferable to return to the jumped-from topic not from the point at which the jump was made but rather from the beginning of the sentence from which the jump was made.

If the help engine did not encounter a hypertext jump command in step S615, then flow advances to step S620 in which the help engine determines whether a hierarchial jump command has been issued. If a hierarchical jump command has been issued, then flow advances to steps S621 through steps S626 so as to process the hierarchical jump command. More specifically, if in step S621 the operator selects a particular topic that is being read from a list of hierarchical topics, then in step S622 the topic is changed to the selected topic and flow returns to step S606 to speak/ display the topic. Selection in step S621 may be made in accordance with an operator indication to select the most recently read topic from the list (for example, by clicking a button on mouse 16) or selection may be made in accordance with a number associated with a list of topics. In this latter case, topics are spoken/displayed sequentially from a list of hierarchical topics and the operator may select any one of those topics at any time (and not just immediately after the topic is spoken and/or displayed) by entering the appropriate number of the topic.

If the operator is not selecting a hierarchical topic in step S621, but in step S623 is selecting the next and/or previous topic via the graphical user interface, then in step S624 the next or previous topic, as stored in list 55, is selected in step S624 and flow returns to step S606 where the topic is spoken and/or displayed.

If next/previous topic processing is not selected in step S623 but previous level processing is selected in step S625, then in accordance with the hierarchical list stored in list 55 the previous topic level is selected in step S626 and flow returns to step S606 to speak the list of topics in that level.

If a hierarchical jump command is not received in step S620, then in step S627 if the operator has input topic repositioning commands then those commands (step S628) are executed and flow returns to step S606 to continue speaking the topic from the repositioned position.

If a topic repositioning command is not received in step S627, but in step S629 a command to close help is received, then in step S630 the help engine is closed down and in step S631 CPU control reverts to the application program 62 which originally instantiated the help engine.

The following is an example of help engine processing in accordance with the hierarchically ordered hypertext topic file shown in Appendix A. The purpose of this example is to show the effects of flow processing in accordance with the navigation commands provided by the graphical user interface 51 and to show how differing voice output can provide an operator with aural cues which define the document structure and which change in accordance with that structure. For purposes of this example, different voices are indicated by the following different text styles:

| Key | |
|---|---|
| <user command> | |
| body of topic | Voice 1 |
| HIERARCHICAL JUMP TOPIC | VOICE 2 |
| transfer-type hierarchical jump topic | Voice 3 |
| return-type hypertext jump topic → | Voice 4 |

For purposes of this example, it is assumed that the help engine is instantiated to begin speaking the Appendix A help file commencing from the primary level hierarchical structure. As described above, however, the help engine may be instantiated to begin speaking the help file from a topic defined by the context of the application program which instantiates the help engine.

Using the above key, the help engine commences speaking the help file commencing with topic number 1, primary hierarchical level, as follows (step numbers from FIG. 6 have been inserted at the left margin):

| | | |
|---|---|---|
| S607 to S609 | 1. GENERAL INFORMATION ABOUT MICROSOFT WINDOWS VERSION 3.1 | |
| | 2. USING MULTIMEDIA EXTENSIONS WITH WINDOWS VERSION 3.1 | |
| | 3. USING SPECIFIC DISPLAYS WITH WINDOWS VERSION 3.1 | |
| S621 | <"Select from menu: "1"> | |
| S606 etc. | General information about Microsoft Windows version 3.1. This document contains important information that is not included in the Microsoft Windows User's Guide or in online Help. If you plan on using a terminate-and-stay resident (TSR) program with Windows, please read the SETUP.TXT online document first. It contains important information about running TSR programs with Windows version 3.1 and Windows Setup. The following topics are covered in this section. | |
| S607 to S609 | 1. Running Windows with an Operating System Other Than MS-DOS | |
| | 2. Preventing Stack Overflow | |
| S621 | <"Jump" command> | |
| S610 to S612 | Preventing Stack Overflow. If, while setting up Windows, Setup detects hardware or software that require a certain stack size | |
| S615 | <"Jump" command> | |
| S616 to S619 | Stacks are temporary data structures that MS-DOS and applications use for processing hardware events. | |
| S606 etc. | If, while setting up Windows, Setup detects hardware or software that require a certain stack size, Setup will place the following command line in your CONFIG.SYS file: stacks=9,256. This should be sufficient most of the time. However, if you receive the Internal Stack Overflow message when running Windows in 386 enhanced mode, or if your system fails for no apparent reason when running Windows in standard mode (especially if you are setting up or moving the mouse), first try increasing the second number on the stacks=command line (for example 256). If that doesn't work, try increasing the first number (for example, 9). For more information about the stacks setting and modifying the CONFIG.SYS file, see your MS-DOS documentation. | |
| S623 | <"previous topic" command> | |
| S607 to S609 | 2. Preventing Stack Overflow | |
| | 3. Using 32-Rit Disk Access | |
| | 4. Using Memory Managers | |
| S621 | <Select from menu "4"> | |
| S606 etc. | This section describes problems you may encounter using memory managers with Windows version 3.1. The following topics will be covered: | |
| S610 to S612 | a. Solving Memory Conflicts by Using MONOUMB.386 or MONOUMB2.386 | |
| S617 | <"Jump" command> | |
| S606 etc. | Solving Memory Conflicts by Using MONOUMB.386 or MONOUMB2.386. If you encounter the following message when starting Windows in 386 enhanced mode, your display driver may be accessing the monochrome address range (B000–B7FF), which prevents the memory manager from using this range for upper memory blocks. | |
| S610 to S612 | To solve this problem, try installing Monumb2.386 on your system. | |
| S617 | <"Jump" command> | |
| S606 etc. | To install Monoumb2.386 do the following: 1. Copy and expand the MONOUMB2.38_file that is on your Windows disk to your Windows SYSTEM directory by typing the following at the MS-DOS prompt: expand monoumb2.38_c:>indows§ystems 2. Add the following setting to the [386Enh] section in the SYSTEM.INI file: device=monoumb2.386 3. Start Windows. Note: MONOUMB2.386 may not work with some memory managers, such as EMM386.EXE. In this case, you can try | |

-continued

| | |
|---|---|
| | using MONOUMB.386, provided with the Windows Driver Library. To obtain a copy of the Windows Driver Library. To obtain a copy of the Windows Driver Library, contact Microsoft. You can also exclude the address region B000–B7FF, which specifies that the memory manager should not try to use this address range for upper memory blocks. For information about |
| S610 to S612 | excluding specific address ranges, see solving memory conflicts by excluding an address range. |
| S613 to S614 | <stop until further operator input> |

Instead of this last step ("<stop until further operator input>"), and as mentioned above, it is possible in the alternative to continue speaking with the next sequential topic and in the absence of operator input continue speaking until all topics in the current hierarchical level have been spoken.

The above example is representative only, and the scope of the invention should not be measured against the example but rather should be measured against the appended claims.

APPENDIX A

The following is one possible example of how a hypertext document, here, a hierarchically-ordered hypertext document, might be structured to be used by the spoken/visual help engine of the invention. There are three hierarchical levels: primary level, secondary level, and topic level (topic #'s 1 to 10). Within the body of the document, transfer-type Jump Topics are denoted by a single underline and return-type Jump Topics are denoted by a double underline.

Note. Though the Contents contains three subject headings corresponding to three subjects at the secondary level, only the first one (General Information About Microsoft Windows Version 3.1) is included in this appendix.

CONTENTS

1. General Information about Microsoft Windows Version 3.1
2. Using Multimedia Extensions with Windows Version 3.1
3. Using Specific Displays with Windows Version 3.1

Primary Level End

1. General Information About Microsoft Windows Version 3.1

This document contains important information that is not included in the Microsoft Windows User's Guide or in on-line Help.

If you plan on using a terminate-and-stay resident (TSR) program with Windows, please read the SETUP.TXT online document first. It contains important information about running TSR programs with Windows version 3.1 and Windows Setup.

The following topics are covered in this section:

1. Running Windows With An Operating System Other Than MS DOS
2. Preventing Stack Overflow
3. Using 32-Bit Disk Access
4. Using Memory Managers Subject #1 End 1. Running Windows with an Operating System Other Than MS DOS Microsoft Windows and MS-DOS work together as an integrated system. They were designed together and extensively tested together on a wide variety of computers and hardware configurations. Running Windows version 3.1 on an operating system other than MS-DOS could cause unexpected results or poor performance.

Topic #1 End

2. Preventing Stack Overflow

If, while setting up Windows, Setup detects hardware or software that require a certain size for stacks, Setup will place the following command line in your CONFIG.SYS file: stacks=9,256

This should be sufficient most of the time. However, if you receive the Internal Stack Overflow message when running Windows in 386 enhanced mode, or if your system fails for no apparent reason when running Windows in standard mode (especially if you are setting up or moving the mouse), first try increasing the second number on the stacks=command line (for example, 256)

If that doesn't work, try increasing the first number (for example, 9). For more information about the stacks setting and modifying the CONFIG.SYS file, see your MS-DOS documentation.

Topic #2 End

3. Using 32-Bit Disk Access

By default, 32-bit disk access is turned off to prevent disk errors on some battery-powered portable computers. However, 32-bit disk access may run correctly with some battery-powered portable computers, such as the Zenith MasterSport SL. If you want to try using 32-bit disk access, select the 32-bit disk access check box in the Virtual Memory dialog box (choose the 386 Enhanced option in Control Panel).

Topic #3 End

4. Using Memory Mangers

This section describes problems you may encounter using memory managers with Windows version 3.1 The following topics are covered.

a. Solving Memory Conflicts by Using MONOUMB.386 or MONOUMB2.386
   b. Solving Memory Conflicts by Excluding An Address Range
   c. Using 386 MAX Topic #4 End a. Solving Memory Conflicts by Using MONOUMB.386 or MONOUMB2.386

If you encounter the following message when starting Windows in 386 enhanced mode your display driver may be accessing the monochrome address range (B000–B7FF), which prevents the memory manager from using this range for upper memory blocks:

To solve this problem, try installing MONOUMB2.386 on your system. MONOUMB2.386 is a device driver provided with Windows that allows certain memory managers to use the monochrome address range for upper memory blocks, even if your display driver is accessing this range.

Topic #5 End b. Solving Memory Conflicts by Excluding an Address Range

If you encounter the following message when starting Windows in the 386 enhanced mode, and the address specified is not B000, you must exclude the address range.

If the address specified is B000, you can try using MONOUMB2.386 or MONOUMB.386. If you are using QEMM, you need to include the X=option on the device=qemm386.sys command line in your CONFIG.SYS file. For example, to exclude the address range C000–C7FF, you would specify the following:

```
device=qemm386.sys X=C000-C7FF
```

Topic #6 End c. Using 386MAX

If you are running 386MAX with Windows version 3.1, note the following:

● Do not use options that limit the EMS swap region in the upper memory area. If you include exclude=options on the 386max or bluemax command line or in the .PRO file (usually called 386MAX.PRO), make sure that the address range specified does not extend beyond A000. See the example on address range boundaries.

● Do not load SMARTDrive when QCache is running.

If you update an earlier version of 386MAX to version 6.0, the 386MAX version 6.0 setup program may not remove the LOAD=WINDOWS.LOD line from your .PRO file. You can remove this line manually. It is not needed and removing it will free up a small amount of memory.

Topic #7 End installing MONOUMB2.386

To install MONUMB2.386 do the following.

1. Copy and expand the MONOUMB2.38_ file that is on your Windows disk to your Windows SYSTEM directory by typing the following at the MS-DOS prompt:

```
expand monoumb2.38_ c:\windows\system
```

2. Add the following setting to the [386Enh] section in the SYSTEM.INI file:

```
device=monoumb2.386
```

3. Start Windows.

Note: MONOUMB2.386 may not work with some memory mangers, such as EMM386.EXE. In this case, you can try using MONOUMB.386, provided with the Windows Driver Library. To obtain a copy of the Windows Driver Library, contact Microsoft.

You can also exclude the address region B000–B7FF, which specifies that the memory manager should not try to use this address ranges, see the following topic.

Topic #8 End

Example on address range boundaries

For example, exclude=1800–A000 is acceptable, but exclude+1800-B800 is not. If the address range specified by using the exclude=option extends beyond A000, Windows may not run properly in 386 enhanced mode. If you must exclude an address range above A000, use the RAM=option instead. For more information about this and other options, see your 386MAX documentation.

Topic #9 End

Stack

Stacks are temporary data structures that MS-DOS and applications use for processing hardware events.

Topic #10 End

What is claimed is:

1. A method for processing a hypertext file of topics, at least some of the topics including text and at least one hypertext link to a jump topic, comprising the steps of:

executing an application program which includes operator-invocable commands to execute a help engine which is settable to provide any one of spoken help, visual help, and both spoken and visual help;

instantiating the help engine in response to operator commands;

displaying topics from the hypertext file of topics in a case where the help engine is set to provide visual help; and speaking topics from the hypertext file of topics in a case where the help engine is set to provide spoken help, wherein text in the topics is spoken in a first voice, and wherein said at least one hypertext link in the topics is spoken in a second voice which is different from the first voice so as to provide an aural cue that said at least one hypertext link and not text is being spoken.

2. A method according to claim 1, further comprising the step of passing context of the application program to the help engine, wherein in said displaying and said speaking steps, topics are displayed and/or spoken commencing with the context passed from the application program.

3. A method according to claim 1, further comprising the step of displaying a graphic user interface by which the help engine is controlled.

4. A method according to claim 3, wherein the hypertext file is arranged hierarchically, and wherein the graphic user interface includes a set of processing commands to process the hierarchical levels of the hypertext file.

5. A method according to claim 4, wherein the set of processing commands includes commands to jump to different topics.

6. A method according to claim 4, wherein the set of processing commands includes commands to jump to different levels.

7. A method according to claim 4, wherein the set of processing commands includes commands to reposition display and/or speaking of the topic.

8. A method according to claim 1, further comprising the step of storing one of said at least one hypertext link.

9. A method according to claim 8, further comprising the step of jumping to the topic specified by the stored link in response to user jump commands and speaking and/or displaying the jump topic.

10. A method according to claim 9, further comprising the step of returning to the jumped-from topic at the conclusion of the jump topic.

11. A method according to claim 1, wherein the hypertext file is arranged hierarchically, and further comprising the step of detecting and storing the hierarchical structure of topics.

12. A method according to claim 11, further comprising the step of jumping to different topics in the stored hierarchical structure in accordance with operator commands.

13. A method according to claim 11, further comprising the step of speaking the stored hierarchical structure of topics.

14. A method according to claim 13, further comprising the step of jumping to a selected one of the spoken topics.

15. A method for processing a hypertext file of topics, at least some of the topics including text and at least one hypertext link to a jump topic, comprising the steps of:

a first speaking step of serially speaking, in a first voice, text in a first topic from the hypertext file of topics;

encountering one of said at least one hypertext link to a jump topic in the file, and speaking the encountered hypertext link in a second voice which is different from the first voice so as to provide an aural cue that one of said at least one hypertext link and not text is being spoken;

jumping to the jump topic specified by the encountered hypertext link in response to a user jump command; and a second speaking step of speaking, in the first voice, the jump topic.

16. A method according to claim 15, further comprising the steps of encountering, while in the jump topic, another of said at least one hypertext link to a second jump topic, and jumping to the second jump topic.

17. A method according to claim 15, further comprising the step of returning to the first topic at the conclusion of speaking the jump topic.

18. A method according to claim 15, further comprising the step of detecting context wherein the first spoken topic is context dependent.

19. A method according to claim 15, further comprising the step of displaying a graphical user interface by which an operator may issue jump commands.

20. A method according to claim 19, wherein said graphical user interface is adapted to receive commands to reposition speaking of the topic.

21. A method of processing a hierarchically-ordered hypertext file of topics, at least some of the topics including text and at least one hypertext link to a jump topic, comprising the steps of:

a first speaking step of speaking, in a first voice, text in a first topic from the hierarchically ordered hypertext file of topics;

storing a hierarchical structure of the topics in the file;

a second step of speaking, in a second voice, the stored hierarchical structure of the topics in the file, wherein the second voice is different from the first voice so as to provide an aural cue that the stored hierarchical structure and not text is being spoken;

jumping to a topic specified by the stored hierarchical structure in response to user jump commands; and a third speaking step of speaking, in the first voice, the jumped-to topic.

22. A method according to claim 21, further comprising the step of jumping from the jump topic to a second jump topic in accordance with the stored heirarchical structure.

23. A method according to claim 21, further comprising the step of returning to the first topic at the conclusion of speaking the jump topic.

24. A method according to claim 21, further comprising the step of detecting context wherein the first spoken topic is context dependent.

25. A method according to claim 21, further comprising the step of displaying a graphical user interface by which an operator may issue jump commands.

26. A method according to claim 25, wherein said graphical user interface is adapted to receive commands to reposition speaking of the topic.

27. A method for processing a hypertext file of topics, at least some of the topics including text and at least one hypertext link to a jump topic, comprising the steps of:

executing an application program which includes an operator invocable command to execute a help engine which is settable to provide any one of spoken help, visual help, and both spoken and visual help;

instantiating the help engine in response to operator commands;

passing context of the application program to the help engine; and executing the help engine;

wherein said help engine instantiating step comprises the steps of:

a first speaking step of speaking, in a first voice, text in a first topic from the hypertext file of topics;

encountering one of said at least one hypertext link to a jump topic in the file, and speaking the encountered hypertext link in a second voice which is different from the first voice so as to provide an aural cue that one of said at least one hypertext link and not text is being spoken;

jumping to topics specified by said at least one hypertext link in response to user jump commands; and a second speaking step of speaking, in the first voice, the jumped-to topics.

28. A method according to claim 27, further comprising the steps of encountering, while in the jump topic, a hypertext link to a second jump topic, and jumping to the second jump topic.

29. A method according to claim 27, further comprising the step of returning to the first topic at the conclusion of speaking the jumped-to topic.

30. A method according to claim 27, further comprising the step of returning to the first topic at the conclusion of speaking the jumped-to topic.

31. A method according to claim 27, wherein the hypertext file is arranged hierarchically, and wherein said help engine executing step further comprises the steps of storing hierarchical structure of topics in the hypertext file and jumping to topics specified by the stored hierarchical structure.

32. A method according to claim 31, further comprising the step of jumping to a different topic in accordance with the stored hierarchical structure of topics.

33. A method according to claim 31, further comprising the step of speaking the stored hierarchical structure of topics in a voice that is different from the first voice so as to provide an aural cue that the stored hierarchical structure and not text is being spoken.

34. A method according to claim 33, further comprising the step of jumping to a topic in accordance with a selection from the spoken stored hierarchical structure.

* * * * *

UNITED STATES PATENT AND TRADEMARK OFFICE
CERTIFICATE OF CORRECTION

PATENT NO. : 5,699,486

DATED : December 16, 1997

INVENTOR(S) : Thomas S. Tullis, et al.

It is certified that error appears in the above-identified patent and that said Letters Patent is hereby corrected as shown below:

Column 2, line 46, change "diagram" to --diagrams--.

Column 4, line 16, change "strucrue" to --structure--.

Column 5, line 57, change "diagram" to --diagrams--.

Column 14, lines 33 to 35, delete Claim 30 in its entirety.

Signed and Sealed this

First Day of December, 1998

Attest:

BRUCE LEHMAN

*Attesting Officer*    *Commissioner of Patents and Trademarks*